United States Patent [19]

Szalankiewicz et al.

[11] Patent Number: 5,353,920
[45] Date of Patent: Oct. 11, 1994

[54] EXTENSIBLE CONTINUOUS HAULAGE SYSTEM

[75] Inventors: James J. Szalankiewicz, Indiana; Alan R. Polka, Slickville; Scott A. Walter, Kittanning, all of Pa.

[73] Assignee: S&S Slides, Inc., Kittanning, Pa.

[21] Appl. No.: 125,598

[22] Filed: Sep. 23, 1993

[51] Int. Cl.⁵ ............................................. B65G 15/08
[52] U.S. Cl. .................................. 198/823; 198/860.1
[58] Field of Search ............... 198/823, 860.1, 860.2, 198/861.1, 583, 584; 299/43, 64

[56] References Cited

U.S. PATENT DOCUMENTS

| | | |
|---|---|---|
| 2,584,288 | 2/1952 | Przybylski . |
| 2,702,115 | 2/1955 | Cunningham .................. 198/823 X |
| 2,731,138 | 1/1956 | Parisi . |
| 2,842,257 | 7/1958 | Craggs et al. . |
| 2,850,146 | 9/1958 | Madeira . |
| 2,851,149 | 9/1958 | Presti et al. . |
| 2,873,022 | 2/1959 | Murphy . |
| 2,909,273 | 10/1959 | Smith . |
| 2,976,982 | 3/1961 | Murphy . |
| 2,986,266 | 5/1961 | Moon . |
| 2,992,723 | 7/1961 | Poundstone . |
| 3,200,940 | 8/1965 | Higgins . |
| 3,289,816 | 12/1966 | Baechli . |
| 3,586,154 | 6/1971 | Schultz . |
| 3,621,983 | 11/1971 | Arentzen et al. . |
| 3,796,503 | 3/1974 | Dawson ...................... 198/860.1 X |
| 4,031,997 | 6/1977 | Nelson ............................. 299/64 X |
| 4,215,776 | 8/1980 | Esler ................................. 198/823 |
| 4,474,287 | 10/1984 | Thompson ........................ 198/812 |
| 4,475,648 | 10/1984 | Weeks ....................... 198/860.1 X |
| 4,696,236 | 9/1987 | Kanayama ............................ 104/65 |
| 4,736,835 | 4/1988 | Hinkle ............................. 198/860.1 |
| 4,754,864 | 7/1988 | Cross, Jr. ............................ 198/526 |
| 4,789,056 | 12/1988 | Bourbeau ........................... 198/823 |
| 4,793,470 | 12/1988 | Andersson ......................... 198/823 |
| 4,869,358 | 9/1989 | Chandler .......................... 198/309 |
| 4,896,764 | 1/1990 | Neunzert ......................... 198/812 |
| 4,932,516 | 6/1990 | Andersson ......................... 198/823 |
| 4,969,691 | 11/1990 | Moore et al. ........................ 299/18 |
| 4,986,412 | 1/1991 | Brais ................................. 198/592 |
| 5,007,528 | 4/1991 | Hideharu .......................... 198/823 |
| 5,038,924 | 8/1991 | Stoll ................................. 198/823 |
| 5,056,655 | 10/1991 | Justice ............................. 198/812 |
| 5,103,967 | 4/1992 | Stoll ................................. 198/823 |
| 5,108,153 | 4/1992 | Pennington et al. ......... 198/860.2 X |

*Primary Examiner*—Cheryl L. Gastineau
*Attorney, Agent, or Firm*—Douglas G. Glantz

[57] ABSTRACT

An extensible conveyor apparatus and method for a continuous haulage system include a continuous conveyor belt for carrying coal or ore discharged from a continuous miner, a top slider for supporting the coal-carrying or ore-carrying continuous conveyor belt, a bottom belt return, and a slider holding frame for holding the top slider, wherein the slider holding frame is provided by a plurality of floor-supported frame members held in position by belt tension, the slider holding frame being capable of rapid and nimble extendable, retractable construction in the mine. Rails connect and hold adjacent frame members in position by press-fit attachment of the rails to the frame members. The rails preferably are quickly rotatable to change the top wearing surface. A top slider for supporting the mined-material-carrying belt is composed of a material which is lightweight, flame-resistant, and quickly replaceable in an underground mine.

16 Claims, 2 Drawing Sheets

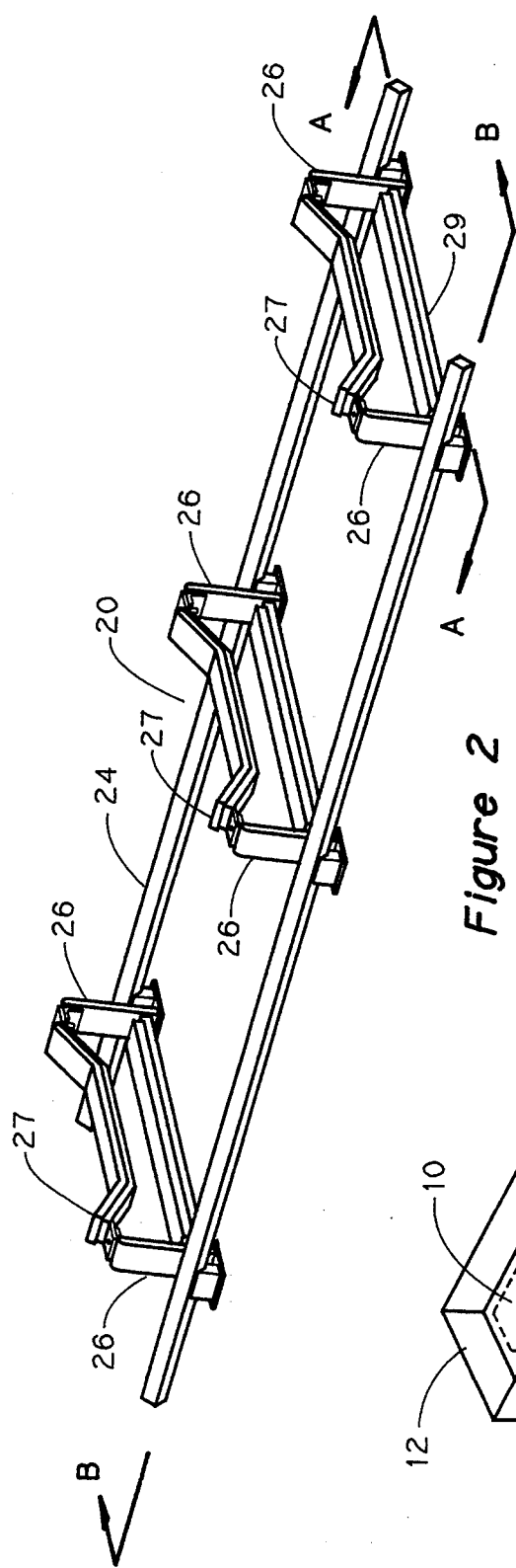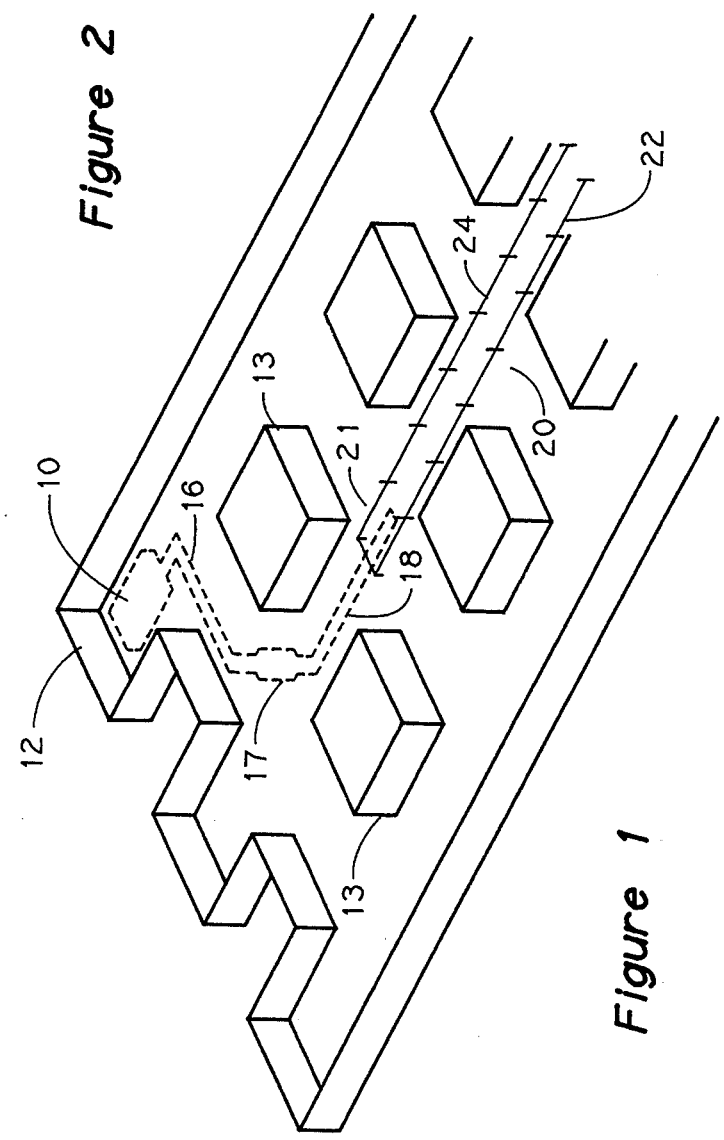
Figure 2
Figure 1

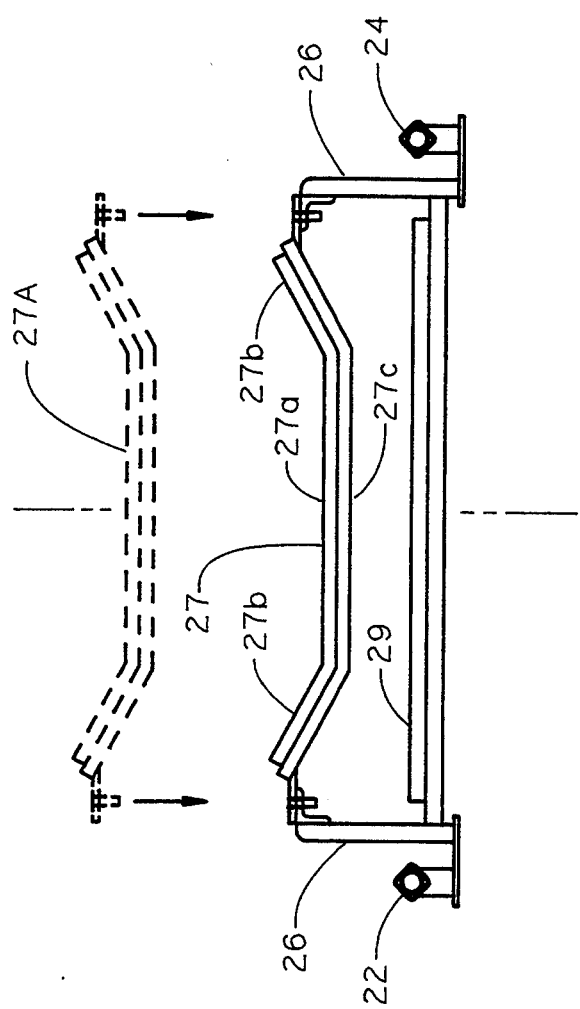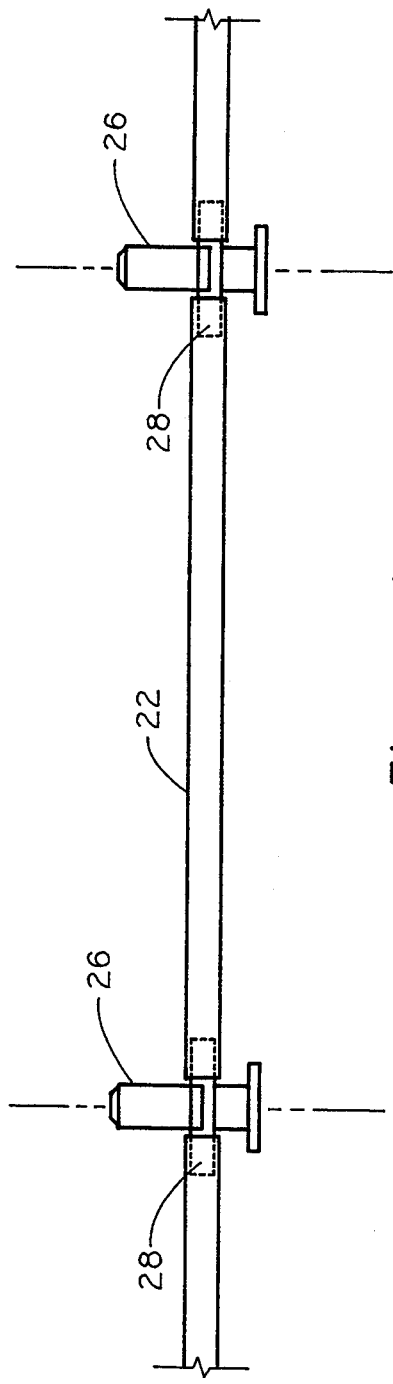

EXTENSIBLE CONTINUOUS HAULAGE SYSTEM

BACKGROUND OF THE INVENTION

1. Technical Field

This invention relates to conveyor apparatus and method for use in mining operations. In one aspect, this invention relates to mining apparatus and method for performing continuous haulage in a mine.

2. Background

Mining operations today use conveyor apparatus extensively to remove material, e.g., such as coal or ore, from the mine. The conveyor apparatus improves productivity over those methods which do not have "continuous" means for removing the mined material from the mine face.

Continuous miner machines work at removing the mined material, e.g., ore or coal, from the mine face and thereby extend into the mine and away from the conveyor or other means for removing the material produced by the continuous miner. After the continuous miner extends so far, the miner must be retracted away from the mine face to install or construct roof supports. Accordingly, the mined material removal means, e.g., the conveyor apparatus, must be capable of extension and retraction in conjunction with movement of the continuous miner.

Conveyor apparatus available commercially today can be viewed as severely limited with respect to its flexibility and ease of operation in providing the extension and retractability for following the continuous miner. A new apparatus and method are needed to provide mined material removal for continuous haulage.

INTRODUCTION TO THE INVENTION

In the mining of coal, particularly but not limited to coal strip mines, many coal seams are exposed and/or identified which have a low vertical seam height. By low vertical seam height is meant less than standing room. The low coal seam vertical height makes it extremely difficult to impossible to recover the coal by conventional deep mining equipment and techniques. The low coal is left behind when the cover over the seam is too high to mine the coal by strip mining techniques. Moreover, since the vertical height of these coal seams is so low, it is extremely difficult, if not impossible, to mine the low coal with people in the shaft.

One technique which has developed to mine low coal is with the use of continuous mining equipment. A continuous miner works at the face of the low seam vertical height coal and separates the coal from the face of the mine. The coal produced from the continuous miner is passed preferably to a continuous haulage system for removal from the face, typically by passing through an extensible conveyor to a mainline conveyor for removal from the mine. By continuous haulage is meant the continuous transportation of the material mined from a continuous miner, from other mining machines, or from a production area to a main conveyor belt or belts leading to the surface or to a main terminal area where the mined material is processed.

U.S. Pat. No. 2,850,146, issued to Madeira, discloses a structure and technique considered to be the beginnings of low belt structure as it is known today. U.S. Pat. No. 2,850,146 discloses a portable conveyor for use in a coal mine represented to be simple in the setting up thereof, and also by ready portability in the mine or the like. An endless conveyor is provided having a pair of cables suspended as catenaries on spaced roof jacks. The endless conveyor belt is represented to be readily and easily disassembled and moved from one location to another location where the conveyor is easily reassembled. When positioned at the new location, it is extensible and retractable with a minimum amount of effort.

U.S. Pat. No. 2,850,146 discloses structure which is cable mounted, supported by roof jacks. A drawback of the cable mounted system involves problems attributable to failure of suspension of the conveyor line when even just one roof jack loses its support. Loss of roof support is a problem which can and does occur, resulting in the cable structure losing its support.

The U.S. Pat. No. 2,850,146 utilizes rollers, not sliders, and the structure disclosed in U.S. Pat. No. 2,850,146 is intended to be readily installed, but the actual structure design is deficient in the length of time actually needed to install it. The apparatus and methods disclosed in U.S. Pat. No. 2,850,146 are not designed to run continuous haulage because the Madeira conveyor does not form a track needed for the mobile bridge units extending from and attached to the continuous mining machine to tram or travel in order to form the continuous haulage system.

In underground mining, and particularly in underground mining wherein the vertical work space affords less than standing room, physical tasks are made more difficult by the confined spaces and constraints imposed by the underground mine. Although the apparatus and method of the present invention are not intended to be limited by particular dimensions in a mine, physical movements and activity are made significantly more demanding in low seam mining, e.g., less than 48 inches in vertical height.

When conveyor apparatus is used to remove material from the mine, and when the conveyor apparatus is called upon to extend and retract in conjunction with the continuous miner, the conveyor must be repeatedly constructed and later broken down in the confining spaces and constraints within the mine. Conventional conveyor apparatus can be viewed as severely lacking in the areas of facilitating extension or retraction while accommodating the difficult physical activities found in the confining spaces or constraints in the underground mine. Novel apparatus and method are needed to facilitate rapid and flexible extension and retraction of the conveyor in the underground mine.

Conventional conveyor belts typically use idler rollers and/or roller bearings for carrying the main belt for hauling material on the endless conveyor belt. The idler rollers and/or roller bearings have a high frequency of failure in the hostile environment of the mine. These failures are attributable to water, corrosion, dust, or other hostile agents found in the mine. When the idler rollers or roller bearings fail, the load bearing surface typically undergoes a grinding operation by the belt as it passes. When the idler roller or roller bearing is ground to a sharp surface, the conveyor belt can be ripped or abraded to the extent that the conveyor must be taken down to replace the belt. Worse yet, the idler roller or similar structure containing roller bearings can be ground in such a way that the conveyor belt rubbing against the sharp roller surface is rubbed hot to the point of creating a fire. It is well known that a fire in the mine is to be prevented whenever possible because of elimination of air in the mine and generation of life-threatening carbon monoxide.

The problems with idler rollers or with rollers containing roller bearings are made more acute with low vertical height mining. The problems are more acute in low vertical height mining because the rollers must be made of smaller diameter. The smaller diameter rollers must travel faster and are more likely to fail because of the higher number of revolutions per unit time. Accordingly, novel conveyor apparatus and method are needed to eliminate problems attributable to idler rollers and other rollers using roller bearings.

It has been proposed to use slides as substitute apparatus for idler rollers. Slides are available commercially, made typically of stainless steel. However, stainless steel has a high coefficient of friction, e.g., such as on the order of 0.55–0.7, and the stainless steel wears out because of a higher coefficient of friction and the attendant abrasion that goes with the higher coefficient of friction. When the stainless steel slider wears out, or in anticipation of the slider wearing out as part of a preventative maintenance program, the stainless steel slider must be periodically disassembled and taken out of the mine to put in a new stainless slider. The stainless steel slider is taken out of the mine to weld in place the metal slider into the slider frame. The rebuilt stainless steel slider then is taken back into the mine and retrofitted into the conveyor.

Accordingly, novel conveyor apparatus and method are needed to overcome the drawbacks attributable to materials such as stainless steel having limited abrasion resistance and difficult fabrication.

U.S. Pat. No. 4,789,056, issued to Bourbeau, discloses a slider bed conveyor apparatus and method also incorporating idler rollers. The patent discloses that when a load such as impact loads are placed on the conveyor belt, the slider bed supports the conveyor belt at the point where the material is loaded. This action in receiving the impact loads resists sagging and stretching of the conveyor belt and also reduces wear on the idler rollers. The idler rollers are mounted on a shaft and are adapted to be adjustable vertically depending on the load requirements. The conveyor belt system is modular and of unitary structure, and several modules can be joined to form a conveyor belt system of any designed length.

U.S. Pat. No. 5,038,924 and U.S. Pat. No. 5,103,967, issued to Stoll, disclose an impact saddle for use in place of a conventional impact roller assembly for supporting a bulk material conveyor at an impact zone. The assembly includes a support frame adapted to be positioned in transverse relation to the length of the belt. The support frame forms a pair of side-by-side T-shaped supports which extend in parallel relation transversely of the belt. A plurality of polymeric low friction segments, such as high molecular weight polyethylene, are formed with lower T-shaped slots which are adapted to receive the T-shaped supports for threading onto the support frame. The segments have upper surfaces which collectively form a support for a section of the conveyor belt in the impact zone.

U.S. Pat. No. 4,215,776, issued to Esler, discloses a belt conveyor idler having a ridged U-shaped channel fixedly mounted on a pair of spaced supports. A rigid strip of a low-friction material, such as high molecular weight polyethylene, is fixedly mounted within the channel and extends transversely across the path of the conveyor belt for slideably supporting the conveyor belt. The channel and strip of low-friction material each have a complimentary catenary configuration for the load-bearing troughing run of the conveyor belt and a straight horizontal configuration for the return run of the belt.

Conveyors such as the Esler conveyor will not work with continuous haulage systems. By continuous haulage is meant the uninterrupted transportation of material from a mining unit to the mine transportation system by several units of haulage equipment and an associated continuous and advancing conveyor system. The Esler conveyor further will not provide or facilitate the extension or retraction such that the conveyor can be put together and taken apart quickly and easily, particularly with confining spaces and constraints in an underground mine.

Accordingly, new mining conveyor apparatus and method are needed to overcome the deficiencies found in conventional systems.

It is an object of the present invention to provide novel mining conveyor apparatus and method for a continuous haulage system.

It is another object of the present invention to provide an extensible mining conveyor apparatus and method capable of rapid and nimble extendable and retractable construction in a mine.

It is another object of the present invention to provide an extensible conveyor apparatus and method for providing a continuous conveyor belt for carrying coal or ore discharged from a continuous miner.

It is a further object of the present invention to provide an extensible conveyor apparatus having a slider holding frame capable of rapid and nimble construction and disassembly in the confining spaces and constraints of an underground mine.

It is a further object of the present invention to provide an extensible conveyor apparatus having a slider holding frame capable of rapid and nimble construction and disassembly in the confining spaces and constraints of an underground mine for mining low coal.

SUMMARY OF THE INVENTION

The present invention provides an extensible conveyor apparatus and method for a continuous haulage system, including a continuous conveyor belt for carrying coal or ore discharged from a continuous miner, a top slider for supporting the coal-carrying or ore-carrying continuous conveyor belt, a bottom belt return, and a slider holding frame for holding the top slider, wherein the slider holding frame is provided by a plurality of floor-supported frame members held in position by belt tension, the slider holding frame being capable of rapid and nimble extendable, retractable construction in the mine.

The present invention includes rails for connecting and holding adjacent frame members in position by press-fit attachment of the rails to the frame members. The rails preferably are quickly rotatable to change the top wearing surface.

The present invention provides a top slider for supporting the mined-material-carrying continuous conveyor belt, the top slider being composed of a material which is lightweight, low friction, long wearing, flame-resistant, and quickly replaceable in an underground mine.

BRIEF DESCRIPTION OF THE DRAWINGS

FIG. 1 depicts the continuous mining operation in an underground mine by the room and pillar method and shows the tail piece and inboard or inby portion of the conveyor of the present invention.

FIG. 2 shows a perspective view of the novel conveyor apparatus and method of the present invention.

FIG. 3 shows a section taken along Section A—A of FIG. 2 of the novel conveyor apparatus and method of the present invention.

FIG. 4 shows a section taken along Section B—B of FIG. 2 of the novel conveyor apparatus and method of the present invention.

DETAILED DESCRIPTION

Referring now to FIG. 1, continuous miner 10 is shown operating in position at the mine face 12 in a room and pillar method of mining. Coal is mined at the mine face 12 to form rooms with pillars 13 of coal remaining for support. Continuous miner 10 is operated to remove most of the vertical coal or ore from the seam and to leave just a very thin top and bottom layer of coal or ore behind. In this manner, the mined material is not contaminated with rock or other materials found vertically just adjacent to and outside a coal seam.

Continuous miner 10 removes material from the face 12 and transports and passes the material along bridges 16, 17, and 18 to conveyor apparatus 20. Conveyor apparatus 20 has tail piece 21 and side rails 22 and 24. Coal from the continuous miner is typically passed along bridges 16, 17, and 18 to be discharged onto conveyor 20. Conveyor 20 carries the mined material to a main conveyor (not shown) for carrying the mined material out of the mine.

Referring now to FIG. 2, conveyor 20 includes side rails 22 and 24 interconnected with slider holding frame 26 for holding top slider 27 and bottom belt return support 29. Slider holding frames 26 are floor-supported frame members.

FIG. 3 shows the novel mining conveyor apparatus as viewed along Section A—A of FIG. 2.

Top slider 27 is shown having a substantially horizontally disposed middle section 27a and upwardly turned end sections 27b to form a troughing or cupping angle greater than about 15° of troughing/cupping and, preferably, greater than about 20°. Most preferably, horizontally disposed middle section 27a and upwardly turned end sections 27b form a troughing or cupping angle greater than about 27°.

Side rails 22 and 24 on opposite sides of the conveyor frame apparatus are shown having substantially equal angular sides and side dimensions so that the rails can be rotated to change the top surface as will be described in detail hereinbelow.

Bottom belt return support 29 preferably of a lightweight abrasion-resistant material supports the belt return for the endless belt conveyor system.

The wearing surface of top slider 27 can be replaced in the mine by removing insert 27b-27a-27b from slotted holder 27c. A new lightweight insert 27b-27a-27b can be fitted into slotted holder 27c and fastened into position by any suitable fastener, e.g., such as by Number 12×1 sheet metal screws using an electric drill to fabricate the new top slider quickly in place in the mine.

The top slider 27 is founded such that it can be installed with any side (27b) on either of the slider holding stands 26. The top slider 27 thereby is interchangeable without regard to which side must be installed on a particular side of the slider holding support stand.

Top slider 27A is shown as it is to be built into the slider holding frame 26. After top slider 27A is positioned into holding frame 26 on either side of the top slider, a simple cotter pin or the like is all. that is needed to hold the top slider in position.

Referring now to FIG. 4, a section B—B taken from FIG. 2 is shown. Side rail 22 is shown to be press fit onto male connecting pin 28 adapted to be affixed to or to be a part of slider holding frame 26. Rail 22 is press fit onto pin 28, and the structure is held together by belt tension of the endless conveyor belt.

Side rails 22 are adapted to be capable of carrying a mobile bridge. The wheels (not shown) of the mobile bridge or other dolly or carriage would run on the top side of rail 22 or 24. The rails 22 and 24 are provided with equal angular sides and side dimensions so that rails 22 and 24 can be rotated such that the wearing caused by the carriage or trolley operating on the top surface thereof can be shared by the other surfaces of the rails 22 and 24.

The novel mining conveyor apparatus and method of the present invention incorporate side rails 22 and 24 which are press fit in attachment to the slider holding frames 26. In a preferred embodiment, the novel mining conveyor apparatus and method of the present invention incorporate a press fit attachment to provide a bolt-free attachment of side rails 22 and 24 to frame stand 26. The floor-mounted belt stand preferably is rigidly connected bolt-free to an adjacent floor-mounted belt stand.

The novel mining conveyor apparatus and method of the present invention provide quick and nimble extendible and retractable construction of the belt stands in the mine to facilitate room advancement. As the continuous miner extends into the face, the novel mining conveyor and method of the present invention can extend with it. The conveyor apparatus of the present invention can provide standard conveyor widths of 30 inches, 36 inches, or 42 inches, or other non-standard widths as required in a particular application. An optional idler roller can be installed as part of the conveyor so that the capacity and/or length of the conveyor can be increased. The conveyor length can be 600 feet or longer and will be limited only by mining regulations.

The floor-mounted slider holding frames are positioned to be interconnected with press-fit attachment of side rails to the frame members. No bolts are needed. The novel mining conveyor and apparatus of the present invention provide a superior advantage over conventional conveyor apparatus in that bolts are eliminated. Workers who have toiled in the dark, confined spaces and constraints, often times working in muck and mire, will appreciate the feature of eliminating these bolts. Bolts typically are lost, dropped, or at least are difficult to thread and bolt up. Moreover, bolts become gunked up in the muck and mire in a mine. The gunked-up bolts are difficult to thread or install. Not only is it easier physically to build and disassemble the novel conveyor of the present invention, but also these bolts are eliminated for a substantial cost savings because these bolts are not cheap, but rather have a material cost on the order of about three dollars each to replace (1993 dollars) irrespective of the labor intensive cost of installation.

The novel mining conveyor and apparatus of the present invention provide an extensible conveyor apparatus for a continuous haulage system including a continuous conveyor belt for carrying coal or ore discharged from a continuous miner, a top slider for supporting the coal-carrying or ore-carrying continuous conveyor belt, a bottom belt return, and a slider holding frame for holding the top slider.

The slider holding frame is provided by a plurality of floor-supported frame members held in position by belt tension, the slider holding frame being capable of rapid and nimble extendable, retractable construction in the mine. The conveyor belt itself holds the floor-mounted slider holding structure together in tension. The conveyor belt is held taut by jack belt tensioning, and the belt tension on the floor-mounted slider holding frame.

The top slider preferably is provided by a material having a low coefficient of friction, e.g., such as a coefficient of friction less than about 0.4. Further, the top slider is comprised of a material having high abrasion resistance. The top slider also preferably is composed of a material having a low flammability acceptable to and approved by the U.S. Mine Safety and Health Administration for service in a mine. Such a material to satisfy these requirements is provided by a material composed of ultra high molecular weight polyethylene available commercially, e.g., such as from Solidur Plastics Company of Delmont, Pa.

The conveyor belt and frame combination of the present invention provides a low profile continuous haulage system for carrying coal from low coal seams, e.g., such as less than about 48 inches in vertical height. The low coal seams make it extremely difficult for physical activity in the confining spaces and constraints of the underground mine. Every physical effort is magnified manyfold in difficulty level by the confining spaces of the low coal.

The side rails, e.g., side rails 22 and 24 as shown in the drawings, are provided by lightweight rails. In one embodiment, the lightweight rails are provided by square tubular steel material and weigh less than about five pounds per foot and preferably less than about four pounds per foot, e.g., such as less than about 25 pounds, preferably less than 20 pounds, over about five feet of length. The lightweight rails of the present invention are compared to rails weighing as much as 100 to 150 pounds and more over about five feet of length in conventional conveyor systems.

The lightweight rails are adapted to be placed into press-fit attachment with protruding pins horizontally fixed to the slider holding frame members. In this way, the side rails include tubular rails acting as pin-receiving connecting members for receiving the protruding pins horizontally fixed on the frame members. The four-sided tubular rails can be quickly rotated to change the top wear surface and extend the service life of the rails for carrying the mobile bridges of the continuous haulage system of the present invention.

The top slider can be formed preferably by a lightweight replaceable slider insert composed of the material described hereinabove. The slider insert can be formed to weigh less than about five (5) pounds, preferably less than about three (3) pounds, and more preferably less than about two (2) pounds and is quickly interchangeable in the mine.

The quick interchangability (in the mine) feature of the present invention eliminates the need to handle, remove, and reinstall stainless steel sliders which typically weigh up to ten times heavier than the slider of the present invention. The stainless steel slider must be removed to a fabrication shop located outside the mine where the stainless steel is welded into place on the frame members as is required in conventional conveyor systems. The slider insert of the present invention, however, can be rebuilt and retrofitted to provide quick interchangability directly in the mine.

The top slider is formed such that it can be installed with any side, 27b, on either of the slider holding stands. The top slider thereby is interchangeable without regard to which side must be installed on a particular side of the slider holding support stand.

The novel mining conveyor apparatus and method of the present invention capable are capable of providing a low profile, lightweight, continuous conveyor apparatus which is quickly extendable, retractable, and moveable in a low seam coal mine for continuous haulage room advancement. The present invention includes a continuous belt, a top slider of a plastic slider insert weighing less than about five (5) pounds, preferably less than about three (3) pounds, and more preferably less than about two (2) pounds and composed of a material having a low coefficient of friction, high abrasion resistance, low flammability, and capable of supporting the continuous belt as it carries coal from the discharge of a continuous miner and for forming a troughing or cupping angle greater than about 25°. The present invention further includes a floor-mounted slider holding stand less than about ten inches in overall vertical height for holding said top slider and a bottom slider belt return in position such that the slider holding stand is capable of and provides quick and nimble extendable or retractable construction in the low seam coal mine to facilitate rapid room advancement at a minimum of continuous miner production downtime.

The present invention further includes lightweight rails weighing less than about five pounds per foot, preferably less than about four pounds per foot, of length interconnecting the slider holding stand without bolts, the rails being capable of carrying a mobile bridge of the continuous miner. The light-weight rails further are quickly rotatable in the low seam coal mine to change wear surfaces on the rail to extend the life of the bridge-carrying rail.

We have found that the conveyor apparatus and method of the present invention permit a mining crew to "belt-up" in as short a time as twenty (20) minutes, for example. This short time is virtually unheard of in mining operations today, particularly in low seam coal mining. This quick extensible capability permits a crew to "belt-up" as many as two and three times per shift, if needed. It has been found that, upon an inspection and analysis of production log sheets for a particular shift or production period, the mining operation can be conducted without an apparent downtime for extending or retracting the novel conveyor apparatus of the present invention.

The novel conveyor apparatus and method of the present invention accordingly are significantly superior over conventional conveyor apparatus and methods which typically result in significantly less production during a shift in which the conveyor must be extended or retracted.

The apparatus and method of the present invention are not intended to be limited to the descriptions of specific embodiments hereinabove, but rather the apparatus and method of the present invention should be viewed in terms of the claims which follow and equivalents thereof.

What is claimed is:

1. An extensible conveyor apparatus for a continuous haulage system, comprising:
   a. a continuous conveyor belt for carrying mined material discharged from a continuous miner in an underground mine;
   b. a top slider for supporting said continuous conveyor belt;
   c. a bottom belt return for supporting said continuous conveyor belt on its return cycle;
   d. a slider holding frame for holding said top slider, said slider holding frame comprising a plurality of floor-supported frame members held in position by belt tension, said slider holding frame capable of rapid and nimble extendable, retractable construction in the mine; and
   e. rails for connecting and holding adjacent frame members in position by press-fit attachment of said rails to said frame members, wherein said rails are quickly rotatable to change the top wear surface.

2. A conveyor apparatus as set forth in claim 1 wherein said rails comprise four-sided tubular rails acting as pin-receiving connecting members for receiving protruding pins horizontally fixed on said frame members.

3. A conveyor apparatus as set forth in claim 2 wherein said top slider provides a large angle of troughing/cupping greater than about 15 degrees of troughing/cupping in said coal-carrying continuous conveyor belt.

4. A conveyor apparatus as set forth in claim 3 wherein said large angle of troughing/cupping is greater than about 20 degrees.

5. A conveyor apparatus as set forth in claim 4 wherein said top slider has a low coefficient of friction less than about 0.4.

6. A conveyor apparatus as set forth in claim 5 wherein said top slider is comprised of a material having a high abrasion resistance.

7. A conveyor apparatus as set forth in claim 6 wherein said top slider is comprised of a material having a low flammability acceptable by the U. S. Mine Safety and Health Administration for service in a mine.

8. A conveyor apparatus as set forth in claim 7 wherein said conveyor belt and frame combination comprises a low profile continuous haulage system for carrying coal from low coal seams less than about 48 inches in vertical height.

9. A conveyor apparatus as set forth in claim 8 wherein said rails comprise lightweight rails weighing less than about 5 pounds per foot of length.

10. A conveyor apparatus as set forth in claim 9 wherein said press-fit attachment comprises a bolt-free attachment of said rails to a frame stand.

11. A conveyor apparatus as set forth in claim 10 wherein said top slider comprises a lightweight replaceable slider insert composed of a material weighing less than about five pounds and is quickly interchangeable in the mine.

12. A method of continuously hauling coal or ore in a mine, comprising:
   a. receiving mined material from a continuous miner in an underground mine;
   b. conveying said mined material on a continuous belt;
   c. supporting said continuous belt by a floor-mounted belt stand rigidly connected bolt-free to an adjacent floor-mounted belt stand and held by tension of said continuous belt on said stands; and
   d. providing a slider supporting said continuous belt and longitudinal rails for connecting said belt stands in position to form a slider holding frame capable of quick and nimble extendable and retractable construction of said belt stands in the mine to facilitate room advancement in the mine, wherein said rails are adapted to carry a wheeled-frame vehicle riding on said rails.

13. A method as set forth in claim 12 further comprising providing a rotatable configuration in said rails to relieve the top wear surface.

14. A method as set forth in claim 12 wherein said wheeled-frame vehicle comprises a mobile bridge attached to said continuous miner.

15. A method as set forth in claim 14, comprising providing said slider for supporting said continuous belt by said floor-mounted belt stand at a low profile vertical height to all components of the combination of elements, thereby providing a continuous haulage of coal or ore from the mine in low vertical seams of coal or ore less than about 48 inches.

16. A low profile, lightweight, continuous conveyor apparatus quickly extendable, retractable, and movable in a low seam coal mine for continuous haulage room advancement, comprising:
   a. a continuous belt;
   b. a top slider comprising a plastic slider insert weighing less than about five pounds and composed of a material having a low coefficient of friction, high abrasion resistance, and low flammability, for supporting said continuous belt as it carries coal from the discharge of a continuous miner and for forming a troughing/cupping angle greater than about 20 degrees;
   c. a bottom slider belt return;
   d. a floor-mounted slider holding stand less than about ten inches in overall vertical height for holding said top slider and bottom slider in position, wherein said slider holding stand is capable of quick and nimble extendable or retractable construction in said low seam coal mine to facilitate rapid room advancement at a minimum of continuous miner production downtime; and
   e. lightweight rails weighing less than about 5 pounds per foot of length interconnecting said slider holding stand without bolts, said rails capable of carrying a mobile bridge of said continuous miner and quickly rotatable in said low seam coal mine to change wear surfaces on said rail to extend the life of the bridge-carrying rail.

* * * * *